United States Patent [19]

Dumousseau et al.

[11] Patent Number: 4,938,852
[45] Date of Patent: Jul. 3, 1990

[54] RECOVERY OF EUROPIUM (II) VALUES BY ELECTROLYSIS

[75] Inventors: Jean-Yves Dumousseau, Paris; Alain Rollat, La Rochelle; Jean-Louis Sabot, Maisons Laffitte, all of France

[73] Assignee: Rhone-Poulenc Chimie, Courbevoie, France

[21] Appl. No.: 220,263

[22] Filed: Jul. 18, 1988

[30] Foreign Application Priority Data

Jul. 17, 1987 [FR] France .................. 87 10110

[51] Int. Cl.$^5$ ............................... C25B 1/10
[52] U.S. Cl. ........................ 204/86; 204/1.5; 204/93; 204/94; 204/96; 204/129; 423/21.5
[58] Field of Search ............ 204/1.5, 105 R, 252, 204/196, 93, 94, 96, 129, 86; 423/21.5

[56] References Cited

U.S. PATENT DOCUMENTS

| | | | |
|---|---|---|---|
| 3,899,403 | 8/1975 | Cook, Jr. et al. | 204/98 |
| 4,461,748 | 7/1984 | Sabot et al. | 423/10 |
| 4,496,523 | 1/1985 | Bonnin et al. | 423/9 |
| 4,676,957 | 6/1987 | Martin et al. | 423/21.5 |

OTHER PUBLICATIONS

Hopkins, *Electrochemistry of the Rare Earth Group*, The Electrochemical Society, Preprint 89-8, Apr. 15, 1946, pp. 113-114.

"Studies of the Electrochemical Reduction of Europium (III) from Aqueous Solutions on Solid Cathodes", by Zholudeva et al, Chemical Abstracts, vol. 101, No. 19, p. 502, Abstract No. 80655j (1984).

"Recovery of Europium from a Rare Earth Element Mixture", by Kaneko et al., Chemical Abstracts, vol. 105, No. 12, Abstract No. 99923z (1986).

*Primary Examiner*—John F. Niebling
*Assistant Examiner*—David G. Ryser
*Attorney, Agent, or Firm*—Burns, Doane, Swecker & Mathis

[57] ABSTRACT

Highly pure europium (II) values are produced in high yields by electrolytically reducing an aqueous solution of europium (III) values circulating in the cathode compartment of an electrolytic cell, the electrolytic cell including a graphite cathode and an anode compartment separated from the cathode compartment by a cationic exchange membrane, recovering a solution of europium (II) values from the cathode compartment, and advantageously liquid/liquid extracting the europium (II) values therefrom, e.g., with an organic solution of an organophosphorus extractant.

33 Claims, No Drawings

RECOVERY OF EUROPIUM (II) VALUES BY ELECTROLYSIS

BACKGROUND OF THE INVENTION

1. Field of the Invention

The present invention relates to the electrolytic reduction and separation of europium values, together with an electrolysis cell for conducting such electrolytic reduction/separation.

2. Description of the Prior Art

Europium is a rare earth element, the content of which in a variety of minerals is typically quite low compared to that of the other rare earths. On the other hand, its applications, in particular in respect of the luminescence thereof, require a high degree of purity. Consequently, for this particular element there exists a dual problem of separation and purification.

Generally, the production of europium entails processes in which, in a first stage thereof, a reduction of europium (III) to europium (II) is carried out, and, in a second stage, a chemical treatment is carried out exhibiting a high degree of specificity relative to europium.

More precisely, such process is carried out as follows. The initial material is usually a solution of rare earth chlorides, which solution is subjected to treatment through a zinc or zinc amalgam column (Jones column). The europous sulfate is then precipitated from the solution thus treated by the addition of sulfate ions.

Such a process has a number of disadvantages.

First, it lacks flexibility. Further, zinc and mercury are transferred into solution. Zinc interferes with the subsequent separations of the rare earths and the mother liquors of the Jones column must be subjected to a specific mercury depollution treatment.

Finally, the yields and resulting purities are inadequate.

Electrolytic processes too have been proposed for the reduction of europium values. However, the degrees of conversion and faradic yields are characteristically insufficient.

SUMMARY OF THE INVENTION

Accordingly, a major object of the present invention is the provision of an improved electrolytic process for the recovery of europium values in high yields and high degrees of conversion.

Another object of this invention is the provision of an improved process for the separation of europium values, whereby such element is recovered in a very high degree of purity.

Briefly, the present invention features the electrolytic reduction and recovery of europium values, comprising introducing and circulating a solution containing europium (III) into the cathodic compartment of an electrolytic cell equipped with a graphite cathode and separated from the anodic compartment by an ion exchange membrane of the cationic type, applying an electrolysis current to said cell, and, at the outlet of the cathodic compartment, recovering a solution containing europium (II).

The process for the separation of europium values according to this invention is further characterized in that the solution containing europium (II) emanating from the aforementioned cathodic compartment is contacted with an organic solution containing at least one solvent which comprises an acid ester of phosphoric or phosphonic acids, whereby, after the resulting phase separation, an aqueous phase containing europium (II) values and an organic phase are produced.

This invention also features an electrolytic cell for the europium reaction, especially useful for carrying out the electrolytic process described above, and which features a graphite cathode, and a membrane separating the cathodic and anodic compartments of cation exchange type.

DETAILED DESCRIPTION OF THE PREFERRED EMBODIMENTS OF THE INVENTION

More particularly according to the present invention, the electrolytic cell comprehended hereby is, for example, of the filter press type and which comprises a cathodic and an anodic compartment separated by an ion exchange membrane.

In one embodiment of the invention, said membrane is of the cationic type, in particular of strong or weak acid type. Membranes of the sulfonic type are preferably used. Exemplary of such membranes are those marketed under the trademark NAFION, in particular NAFION 415 or 423.

Advantageously according to this invention, the cathode is fabricated from graphite, preferably solid graphite. As regards the anode, it may be of different types, depending upon the particular anolyte used, discussed more fully hereinbelow. Generally, a nickel anode is used, or one based on precious metals and/or the oxides of such metals, for example platinum, titanium dioxide, ruthenium oxide, preferably in the solid form.

As is known to this art, the compartments of the cell may be equipped with turbulence promoters to enhance mass transfer.

The initial solution to be treated in the electrolytic cell according to this invention is a solution containing europium values essentially in the europium (III) state, in particular in the form of the chloride thereof. In general, the solution contains a mixture of essentially trivalent rare earths, in particular in the form of the chlorides thereof.

It will be appreciated that the reduction/separation process according to this invention is particularly applicable to solutions containing, in addition to europium, samarium and gadolinium values, which are elements close to europium in the Periodic Table and are therefore difficult to separate.

The beginning solution may also contain a certain number of impurities, in particular metals present in the water used for dissolving the reagents, for example calcium.

As indicated above, the initial or beginning solution is introduced and circulated in the cathode compartment of an electrolytic cell according to the invention.

Concerning the anolyte circulating within the anode compartment, several possibilities are envisaged.

In a preferred embodiment of the invention, an anolyte is used having a composition enabling the release of oxygen at the anode over the course of the electrolysis.

According to this preferred embodiment, two variants are applicable.

In a first mode of operation, the anolyte is a solution of sulfuric acid, which may additionally contain a sulfate, for example ammonium sulfate.

In such a case, an anode of a platinum/iridium alloy is preferably employed

However, in view of the risk of precipitation of EuSO$_4$, it is preferred, in a second mode of operation hereof, to employ as the anolyte a sodium hydroxide solution. In this case, a nickel anode is employed.

In another embodiment, more or less of industrial interest, an anolyte releasing chlorine is employed, and which may comprise, for example, a solution of rare earth chlorides. This solution can emanate, as will later be seen, from the solution obtained after the electrolysis treatment and the separation of the europium (II) values.

Concerning the operating conditions, it has been determined that it is advantageous to maintain the pH of the solution circulating in the cathode compartment at a value of from 1 to 3. Under these conditions, the reduction of Eu (III) takes place in a quantitative yield.

The pH may be controlled in known manner, for example by the addition of HCl to the catholyte.

As a result of the electrolysis, the solution issuing from the cathode compartment is enriched in Eu (II) values. In conventional manner, this solution may of course be recycled, at least in part, to the cathode compartment. A similar circulation is envisaged for the anolyte.

Furthermore, a plurality of electrolytic cells may be used, mounted in communicating liquid series. In this case, the solution to be treated circulates within the cathode compartment of a first cell and, subsequently, the solution issuing from this compartment, at least a part of which may be recycled as indicated above, is successively transferred into the cathode department of a second and a third cell, with optional recycling in each of the cells.

The number of cells may vary and optionally may be greater than three, this number resulting from a compromise between the different conditions that must be satisfied to obtain the most economical industrial operation possible.

It will also be appreciated that in the case of the cells connected in series, it is advantageous to operate with different current intensities for each cell and decreasing in the direction of the circulation of the solution containing the Eu (III) values.

By virtue of the process of the invention, it is possible to obtain both a degree of conversion of Eu (III) to Eu (II) of at least 90% with an identical faradic yield or on the same order of magnitude.

The europium (II) solution obtained via the above electrolysis process must then be treated to separate the europium values therefrom.

This treatment may be carried out in known manner, i.e., by the addition of a sulfate, typically ammonium sulfate, and precipitation of europous sulfate. Following the separation of the precipitate, the rare earth chloride solution may be recycled as an anolyte into the anode department of the electrolytic cell or cells.

However, this conventional treatment is limited relative to the purity of the europium obtained by the solubility products.

For this reason, in a preferred embodiment of the invention, the europium is separated by liquid/liquid extraction.

In this case, the Eu (II) solution is contacted with an organic solution comprising an organic extractant selected from among the acid esters of phosphoric and phosphonic acids.

These compounds have the following formulae:

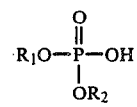

and

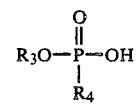

wherein $R_1$, $R_2$, $R_3$ and $R_4$, which may be identical or different, are each a linear or branched chain alkyl, alicyclic, aryl, alkaryl or aralkyl radical.

Preferably, these are compounds which are poorly miscible or immiscible with water and, in particular, those in which at least one of $R_1$, $R_2$, $R_3$ and $R_4$ has at least four carbon atoms.

Exemplary of such extractants, representative are: bis(2-ethylhexyl)hydrogenophosphonate marketed under the trademark PC 88A by the Daichachi Co., bis(2-ethylhexyl)orthophosphoric acid, 2-ethylhexyl hydrogenophenyl phosphonate, n-octyl hydrogenochloromethylphosphonate, dioctylphenyl orthophosphoric acid, bis(1-methylheptyl)orthophosphoric acid, and the like.

The organic solution may further contain a diluent typically selected from among aliphatic or aromatic hydrocarbons, such as toluene, benzene, kerosene, etc.

The proportion of the extractant in the organic solution generally ranges from 10 to 60% by volume.

The solutions are contacted with each other in known manner, in a mixer-decanter type apparatus or a column, for example, and preferably under an inert atmosphere.

Advantageously, the extraction is carried out continuously and countercurrently, over several stages.

Upon completion of each contacting step, the phases are separated and a first aqueous phase containing europium (II) is obtained. Such europium values thus remain essentially in the aqueous phase and in the first organic phase are contained the other rare earth elements which may have been present in the initial aqueous solution, in particular the samarium and gadolinium values.

The organic phase resulting from this first contacting step may advantageously be washed, countercurrently, with a solution of a non-oxidizing acid (for example 0.5 N hydrochloric acid), in order to recover the trace amounts of europium (II) values which may be present therein.

The same organic phase, after the optional washing, may again be contacted with an acid solution (for example, 6 N hydrochloric acid) to back-extract from the solvent small amounts of europium (III) and, generally, the other rare earths.

This organic phase may finally be recycled, after the aforementioned treatments, into the first stage of liquid/liquid extraction described above.

The process of the invention makes it possible to obtain europium of very high purity, i.e., in particular ratios of $Sm_2O_3/Eu_2O_3$ of less than 10 ppm.

As indicated above, the aqueous solutions of europium (II) may contain other metallic impurities, such as calcium or sodium which emanate from the electrolysis. Generally, these impurities remain with the europium in the aforementioned first aqueous phase.

Purification thereof may then be carried out in the following manner.

The first aqueous phase containing Eu (II) and impurities is treated such as to oxidize the europium. This oxidation may be carried out, for example, by means of atmospheric oxygen with the addition of an acid thereto, such as hydrochloric acid. Such phase is then contacted with an organic solution containing a cationic extractant, which may, for example, be of the same type as that described above for the separation of the europium and the other rare earths. This solution can optionally be a fraction of the organic solution issuing from the first stage of contacting and the separation of the europium described above, and also comprehends the optional washing and treatments also mentioned above. This contacting may be carried out under the same conditions as those given for the separation.

After the separation of the phases, a second aqueous phase is obtained, which constitutes an effluent and into which are transferred the metallic impurities, such as calcium and sodium, as is a second organic phase containing europium (III) values.

The europium may be extracted by contacting said second organic phase with an aqueous acid solution, for example a HCl solution.

Following the separation of the phases, a third aqueous phase containing europium (III) values, and constituting the desired final product, and a third organic phase are produced. This third phase may be recycled into the first europium/rare earth separation stage described above.

At the outlet of these different phases, the contents in calcium and sodium, expressed as the $CaO/Eu_2O_3$ and $Na_2O/Eu_2O_3$ ratios, may be less than 10 ppm.

In order to further illustrate the present invention and the advantages thereof, the following specific examples are given, it being understood that same are intended only as illustrative and in nowise limitative.

EXAMPLE 1

An electrolytic cell having the following characteristics was used:
(a) Anode: nickel,
(b) Cathode: solid graphite,
(c) Membrane: NAFION 423,
(d) Electrode surface: 0.5 m$^2$ An aqueous solution of rare earth oxides having the following composition was circulated in the cathode compartment (the percentages are by weight):
(i) Rare earth oxides: 400 g/l
(ii) $Eu_2O_3$: 85% (1.93 mole/l) $Tb_4O_7$: 3%
(iii) $Sm_2O_3$: 5% $Dy_2O_3$: 2%
(iv) $Gd_2O_3$: 5% CaO/rare earth oxides: 350 ppm.

The conditions of electrolysis were the following:
(1) Anolyte: sodium hydroxide, 1 mole/l
(2) Current density: 4 A/dm$^2$
(3) Intensity: 200 A
(4) Cell voltage: 1.8 V
(5) Catholyte flow rate: 3.68 l/h
(6) Catholyte recirculation flow rate: 1 m$^3$/h A solution having a Eu (III) concentration of 0.15 mole/l or 27 g/l was obtained at the outlet of the cathode compartment. The conversion yield was 92%, the faradic yield 88%. The power consumed was 0.312 KWh/kg of $Eu_2O_3$.

EXAMPLE 2

Three electrolytic cells identical to those of Example 1 were used, connected in liquid-communicating series.

Into the first cell, a europium solution having a concentration of 70 g/l of $Eu_2O_3$, or 0.40 M, was introduced at a rate of 400 l/day. The recirculation flow rate was 1.2 m$^3$/h. The conditions of the electrolysis were as follows:

| No. of cell | Conversion proportion, % | I(A) | Voltage (V) |
| --- | --- | --- | --- |
| 1 | 63.2 | 130 | 1.7 |
| 2 | 86.5 | 48 | 1.3 |
| 3 | 95.0 | 38 | 1.2 |

The consumption of electric energy was 0.295 Kwh/kg $Eu_2O_3$.

EXAMPLE 3

The process was commenced using an aqueous solution of rare earth oxides from the cathode compartment of an electrolytic cell according to the invention, at a flow rate of 3.44 l/h. It had the composition given in Example 1 with a weight ratio Eu (II)/total Eu of 90% and $Na_2O$/rare earth oxides of 21%.

In this example, the contacting between the different phases was carried out countercurrently.

The solution was charged into a first extraction battery which also received a flow of 16 l/h of an organic solution of PC 88 A, at a concentration of 1 mole/liter in kerosene, and 0.6 l/h of a 10 N ammonia solution.

The resulting organic phase was washed with a 0.5 N HCl solution at a flow rate of 0.54 l/h and, subsequently, contacted with a 6 N HCl solution at 1 l/h in another battery and recycled to the first extraction battery.

The aqueous solution obtained was treated with oxygen and 6 N HCl at 1 l/h and transferred into a third extraction battery which also received a 10 N ammonia solution at a flow rate of 1.8 l/h and an organic phase identical with that described in the preceding paragraph, at a rate of 45 l/h.

The effluent organic phase was washed with a 0.5 N HCl solution at a low rate of 2 l/h, then transferred to a fourth battery, which also received a 6 N HCl solution at a rate of 3.2 l/h. An aqueous phase having the following composition was obtained:

| | |
| --- | --- |
| $Eu_2O_3$ = 330 g/l | $Tr_2O_3/Eu_2O_3$ less than 10 ppm |
| $CaO/Eu_2O_3$ less than 10 ppm | $Na_2O/Eu_2O_3$ = 50 ppm. |

The organic phase could be recycled to the head of the third battery.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the electrolytic reduction and recovery of europium (II) values, which comprises electrolytically reducing an aqueous solution of europium (III) values circulating in a cathode compartment of an electrolytic cell, said electrolytic cell also comprising an anode compartment separated from said cathode compartment by a cationic exchange membrane, recovering a solution of said europium (II) values from said cathode compartment, and separating europium (II) from other elements contained in the solution of said europium (II).

2. The process as defined by claim 1 said cathode compartment comprising a graphite cathode.

3. The process as defined by claim 2, said anode compartment having an anolyte composition circulating therein which permits oxygen-release at the anode thereof.

4. The process as defined by claim 3, said anolyte comprising a solution of sulfuric acid and a sulfate.

5. The process as defined by claim 3, said anolyte comprising a solution of sodium hydroxide.

6. The process as defined by claim 5, said anode compartment comprising a nickel anode.

7. The process as defined by claim 4, said anode compartment comprising a precious metal anode.

8. The process as defined by claim 2, said circulating solution comprising europium (III) chloride values.

9. The process as defined by claim 8, said circulating solution further comprising rare earth chloride values other than europium.

10. The process as defined by claim 9, said other rare earth values comprising samarium and gadolinium.

11. The process as defined by claim 2, said circulating solution having a pH of from 1 to 3.

12. The process as defined by claim 2, said electrolytic cell comprising a plurality of anode/cathode compartments connected in series, with said europium (III) solution successively circulating through the cathode compartments thereof.

13. The process as defined by claim 12, wherein the intensity of the electrolytic current decreases among the anode/cathode compartments in the direction of circulation of the europium solution.

14. The process as defined by claim 2, wherein at least a fraction of the europium solution recovered from said cathode compartment is recycled thereto.

15. The process as defined by claim 2, said organophosphorus extractant comprising an ester or phosphoric or phosphonic acid.

16. The process as defined by claim 2, further comprising oxidizing the europium (II) values in said first aqueous phase to europium (III) values.

17. The process as defined by claim 16, further comprising liquid/liquid extracting said europium (III) aqueous solution with an organic solution of a cationic extractant, whereby obtaining a second organic phase which comprises said europium (III) values.

18. The process as defined by claim 17, further comprising liquid/liquid extracting said second organic phase with an aqueous acid solution, whereby obtaining a third aqueous phase which comprises said europium (III) values.

19. The process as defined by claim 1, wherein the separating step is carried out by precipitating europous sulfate from said europium (II) solution.

20. A process for the electrolytic reduction and recovery of europium (II) values, which comprises electrolytically reducing an aqueous solution of europium (III) values circulating in a cathode compartment of an electrolytic cell, said electrolytic cell also comprising an anode compartment separated from said cathode compartment by a cationic exchange membrane, and recovering a solution of said europium (II) values from said cathode compartment, and separating europium (II) from other elements by a liquid/liquid extracting process in which the europium (II) solution is put into contact with an organic solution of at least one acid ester of phosphoric and phosphonic acid extractants, whereby europium (II) values are obtained in a first aqueous phase and other elements remain in a first organic phase.

21. The process as defined by claim 20, said cathode compartment comprising a graphite cathode.

22. The process as defined by claim 21, said anode compartment having an anolyte composition circulating therein which permits oxygen-release at the anode thereof.

23. The process as defined by claim 22, said anolyte comprising a solution of sulfuric acid and sulfate.

24. The process as defined by claim 22, said anolyte comprising a solution of sodium hydroxide.

25. The process as defined by claim 24, said anode compartment comprising a nickel anode.

26. The process as defined by claim 23, said anode compartment comprising a precious metal anode.

27. The process as defined by claim 21, said circulating solution comprising europium (III) chloride values.

28. The process as defined by claim 27, said circulating solution further comprising rare earth chloride values other than europium.

29. The process as defined by claim 28, said other rare earth values comprising samarian and gadolinium.

30. The process as defined by claim 21, said circulating solution having a pH of from 1 to 3.

31. The process as defined by claim 21, said electrolytic cell comprising a plurality of anode/cathode compartments connected in series, with said europium(III) solution successively circulating through the cathode compartments thereof.

32. The process as defined by claim 31, wherein the intensity of the electrolytic current decreases among the anode/cathode compartments in the direction of circulation of the europium solution.

33. The process as defined by claim 21, wherein at least a fraction of the europium solution recovered from said cathode compartment is recycled thereto.

* * * * *